United States Patent [19]

Söderström

[11] 4,121,889

[45] Oct. 24, 1978

[54] CLOUD ALTITUDE MEASURING MEANS

[75] Inventor: Sven-Erik Söderström, Västerås, Sweden

[73] Assignee: Asea AB, Västerås, Sweden

[21] Appl. No.: 771,261

[22] Filed: Feb. 23, 1977

[30] Foreign Application Priority Data

Feb. 27, 1976 [SE] Sweden .................... 7602617

[51] Int. Cl.² .............................................. G01C 3/08
[52] U.S. Cl. ...................................... 356/5; 343/17.1 R
[58] Field of Search .................... 356/5; 343/17.1 R

[56] References Cited

U.S. PATENT DOCUMENTS 3,741,655  6/1973  Ling et al. ............................ 356/5

Primary Examiner—S. C. Buczinski

Attorney, Agent, or Firm—Watson, Cole, Grindle & Watson

[57] ABSTRACT

The existence of an object within a predetermined range interval is detected by emitting a series of signal pulses for each range interval and detecting the echo signal pulses. First and second integrators that are respectively responsive to echo signal pulses and to noise pulses integrate the detected signals during different time intervals. The integrated signal and noise components are compared to determine their difference and an indicating pulse is generated by a level detector whenever the compared signals are greater than a predetermined value. First and second delay circuits are provided for controlling the interconnection of the integrators to the respective detectors. Third and fourth time delays respectively control the zeroizing of the integrators and the connection of the level detector to the comprising means.

4 Claims, 3 Drawing Figures

CLOUD ALTITUDE MEASURING MEANS

BACKGROUND OF THE INVENTION

1. Field of the Invention

The present invention relates to a means for measuring cloud altitude.

2. Prior Art

A device which is particularly suitable for measuring cloud altitude is known from U.S. Pat. No. 3,741,655. The known device comprises a measuring equipment of optical radar type, which means that an emitter unit emits short light pulses directed towards an object. In this case the object is a cloud and when such light pulses hit the cloud reflexes occur, and part of the reflected light is intercepted by a receiver unit located adjacent to the emitter. The time required for the light to travel the distance emitter-cloud-receiver is measured and the altitude of the cloud is determined with the known velocity of light as the starting point. The device known from the U.S. Pat. No 3,741,655 further comprises two integrating devices in the receiver unit, which are alternately caused to receive signals intercepted by the receiver unit. One of the integrating devices is designed to receive echo signals expected to be emitted from clouds, and the other integrating device is designed to receive noise signals only. After a number of light pulses have been emitted and echo signals have been received, the contents of the integrating devices are compared, and the result of the comparison is placed in proportion to a pre-determined signal level, and if this level is exceeded the existence of clouds is indicated.

In the event of rainfall from the clouds to which the altitude is to be measured, this will make the measurement considerably more difficult since echo signals are received also from the rain, that is the noise level increases and the cloud echo signals are then more difficult to distinguish. This problem will be described in more detail with reference to FIG. 1 which shows an example of echoes received by the receiver unit in the case of atmospheric precipitation.

The letter A designates an echo characteristic of atmospheric precipitation (fall of rain) with a decay time of $t_A$. B designates a characteristic echo for a cloud with a decay time $t_B$.

The receiver examines the existence of clouds stepwise at intervals with an extension of, for example, 5 meters in the range of 0–1000 meters. In this way one or more cloud veils lying over one another may be continuously registered up to 1000 meters, or to the height where the reflected light does no longer reach back to the receiver.

This measuring in steps is achieved because the receiving intervals for the two integrating devices mentioned are moved in parallel in time so that the whole measuring range is scanned.

According to the U.S. Pat. No. 3,741,655, the pulses controlling the opening of the integrating device, which receives only noise dependent on sun light and the noise generated by the amplifier itself, lie in time before the pulses which control the opening of the second integrating device, which is designed to receive echo signals from clouds. This means that the second integrating device all the time receives signals from a higher height above the ground than the signals received by the first integrating device. The cloud echo B naturally emanates from a higher height than the rain echo A in FIG. 1.

This means that, during the scanning of the measuring range, when echo signals from the cloud are received in the second integrating device, an echo signal derived from the rain under the cloud is received in the first integrating device, and the latter echo signal will completely or partly counterbalance the signal from the second integrating device when the contents of the two integrating devices are compared. This leads to difficulties in obtaining a sufficiently strong signal from the indicating device for certain types of weather.

SUMMARY OF THE INVENTION

With a means according to the invention the abovementioned disadvantage is completely avoided, thus making it possible to measure the cloud height independent of rain.

BRIEF DESCRIPTION OF THE DRAWINGS

The means according to the invention will be described in greater detail with reference to the accompanying drawings which, in addition to the previously mentioned FIG. 1, also comprise FIG. 2 showing an embodiment of a means according to the invention, and FIG. 3 showing characteristic signals for cloud altitude measurement by means of the device according to FIG. 2.

DETAILED DESCRIPTION

Figure 1:
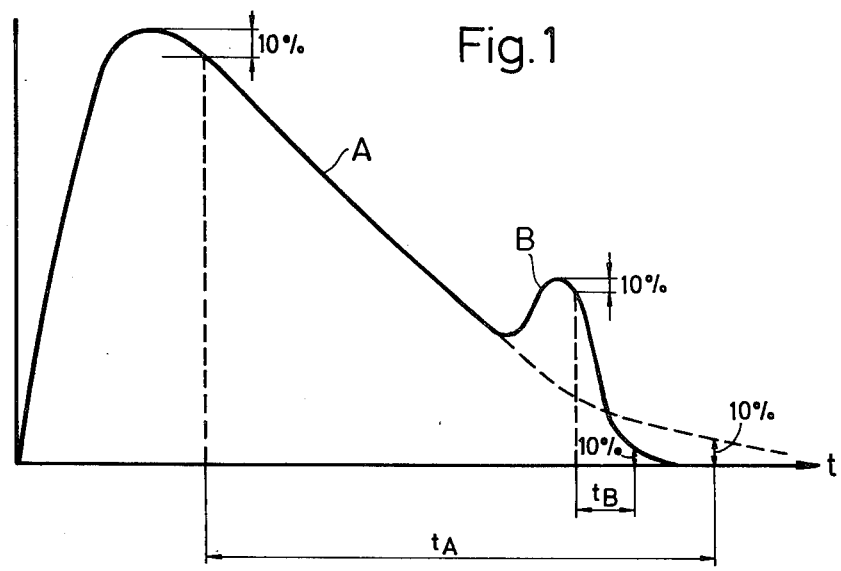
Figure 2:
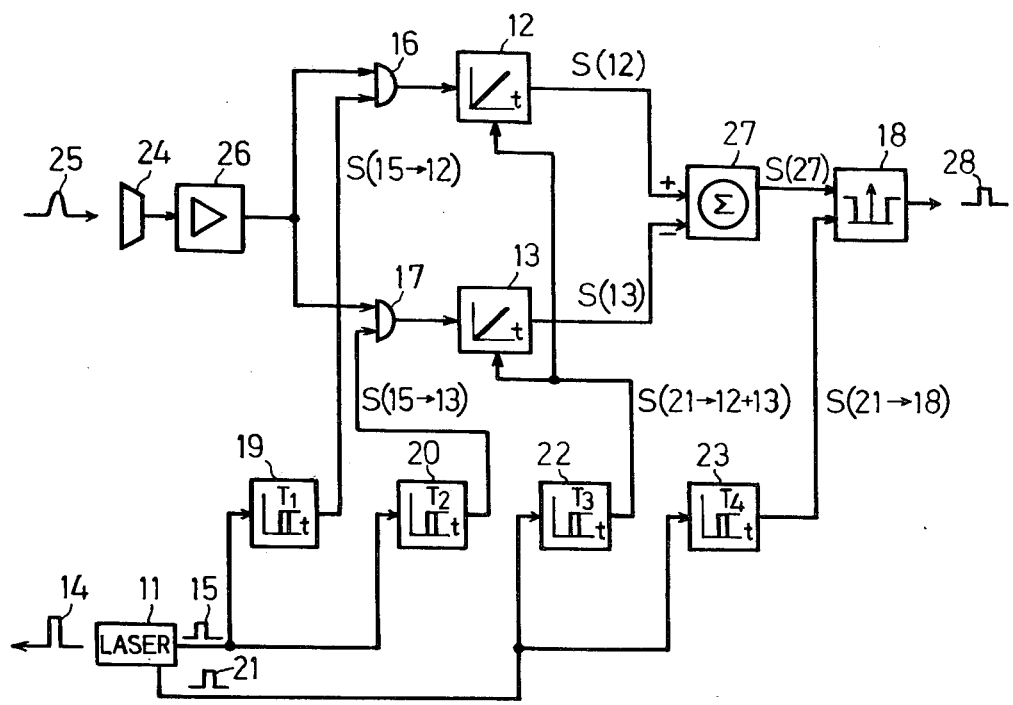

The control pulses which control the opening time for the integrating devices are arranged in time so that the control pulses, which control the integrating device intended to receive an expected cloud echo, lie ahead of the control pulses which control the opening time for the second integrating device. The latter device thus all the time receives echoes from a higher height than the first-mentioned device. In this way a cloud echo will always be recorded, since echoes caused by rain cannot influence the signals from the second integrating device. This is further ensured by the fact that the time between the rear edge of one of the first-mentioned control pulses and the front edge of a subsequent, last-mentioned, control pulse is greater or equal to the longest decay time $t_B$ of cloud echo signals but considerably shorter than the decay time $t_A$ of echo signals from rain. See $t_B$ and $t_A$, respectively, in FIG. 1.

Further, the length of each control pulse is preferably shorter than the length of the shortest cloud echo that can be expected to receive as great an additonal charge as possible to the first integrating device in case of the existence of clouds.

A light emitter 11, preferably consisting of a GaAs laser diode with a required driver, emits a series of light pulses 14 at each position of the reception intervals for the two integrators 12 and 13.

On the emission of each pulse 14, the emitter 11 emits a control pulse 15 to a first AND gate 16 and a second AND gate 17 by way of time delay circuits 19 and 20, respectively. The first time delay circuit 19 delays the pulse 15 for the time $T_1$, the second time delay circuit 20 delays the pulse 15 for the time $T_2$. When the emitter has emitted the last pulse 14 in one and the same receiving interval for the integrators 12 and 13, the emitter 11 delivers a control pulse 21 to the integrators 12 and 13 through a time delay circuit 22 and to a level detector 18 through a time delay circuit 23. The time delay circuit 22 delays the pulse 21 the time $T_3$, and the time delay circuit 23 delays the pulse 21 the time $T_4$. For times $T_1$ and $T_2$, $T_3$ and $T_4$, $T_1 < T_2$ and $T_3 > T_4$.

A light detector 24, which preferably consists of an avalanche photo-diode is arranged to detect that part of the emitted light pulses 14 which is reflected back to earth.

The signals 25 which are detected by the detector 24 are amplified in a signal amplifier 26 and are then supplied to integrators 12 and 13. Control pulses 15 from the emitter 11 control — via time delay circuits 19 and 20, respectively — the time intervals during which the detected signals 25 are supplied to integrators 12 and 13, respectively.

The control pulse 15 opens the respective integrators 12 and 13 for a time which corresponds to the length of the control pulse 15, and the signals emitted by the signal amplifier 26 during that time are integrated. For each control pulse 15 an additional charge is received in the respective integrator, and the magnitude of this charge depends on the signal level at that time, that is noise and echo signals, and the output voltage of each integrator increases with the number of control pulses.

Figure 3:
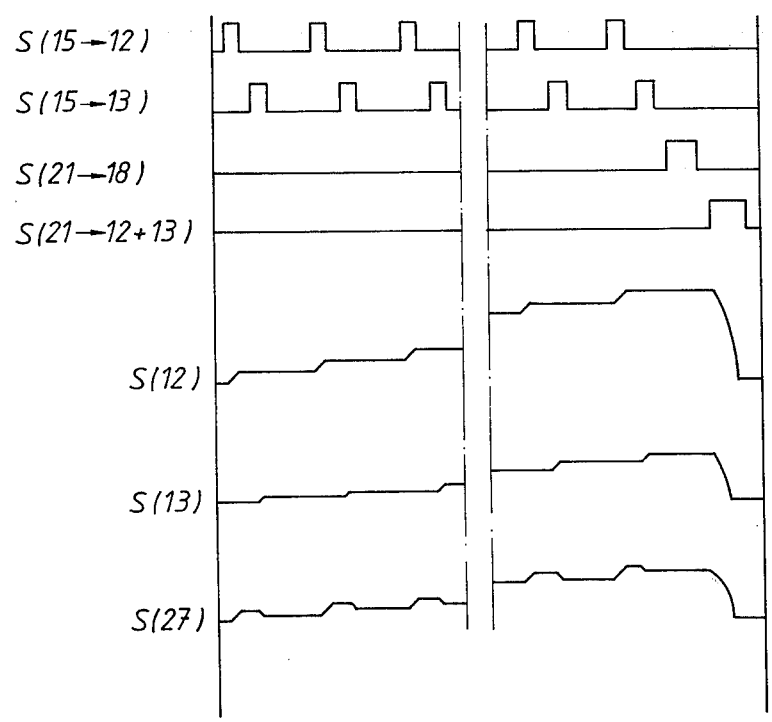

FIG. 3 shows the pulses mentioned above in relation to each other. S (15→12) refers to the control pulses 15 which open integrator 12, and S (15→13) refers to the control pulses 15 which open integrator 13. S (13) and S (12) designate the output voltage of the respective integrators 13 and 12.

During the time interval $T_3$ the output voltages of the integrators 12 and 13 are transmitted to a summation device 27, which emits a signal S (27) as output signal and which is shown in FIG. 3. This signal constitutes the difference between the contents of integrators 12 and 13 at the time in question. At the end of time interval $T_4$, which occurs just before the end of interval $T_3$, control pulse 21 is supplied, by way of time delay circuit 23, to the level detector 18 connected after the summation device 27, said detector 18 sensing whether the signal S (27) exceeds a pre-set level. If that is the case, the level detector delivers an indication pulse 28 which can be fed to a suitable indication member for indicating the existence of clouds.

Immediately after the level detector 18 has started operating and determined the level of signal S (27) in relation to a pre-set value, the integrators 12 and 13 are zeroised by the fact that time delay circuit 22 delivers a control pulse S (21→12+13) which is delayed the time $T_3$. Then the predetermined number pf pulses 14 in a light pulse series have been emitted and the device is ready for measuring in the next stage.

I claim:

1. Means for determining the existence of an object within a predetermined range interval, said means including:
    a signal emitter for emitting a series of signal pulses for each range interval;
    a detector for receiving echo signal pulses originating from said emitted signal pulses;
    first and second integrators respectively responsive to an echo signal pulse and to noise and connectable to said detector for integrating the power of the received echo signal pulses;
    control devices for connecting said first integrator to said detector during a first control pulse time and for connecting said second integrator to said detector during a second control pulse time;
    comparing means connected to said first and second integrator to determine the difference between the power of the echo signal pulses integrated by the first integrator and the power of the echo signal pulses integrated by the second integrator;
    a level detector connectable to said comparing means and arranged to deliver an indicating pulse when said difference exceeds a predetermined value;
    a first time delay circuit for controlling the connection of said first integrator to said detector a first time interval after each emitted signal pulse in said series of signal pulses;
    a second time delay circuit for controlling the connection of said second integrator to said detector a second time interval after each emitted signal pulse in said series of signal pulses, and said second time interval being longer than said first time interval;
    a third time delay circuit for controlling the resetting of the integrators by transmitting a control pulse to said integrators a third time interval after the last signal pulse in each series of signal pulses; and
    a fourth time delay circuit for controlling the connection of said level detector to said comparing means a fourth time interval after the last pulse in said series of signal pulses is emitted, said fourth time interval being shorter than said third time interval.

2. Means according to claim 1, in which the time interval between the end of said first control pulse time and the beginning of said second control pulse time is at least as long as the longest decay time for an echo signal from a cloud.

3. Means according to claim 1, in which the time interval between the end of said first control pulse time and the beginning of said second control pulse time is shorter than the decay time for an echo signal which is derived from the rain from a cloud.

4. Means according to claim 1, in which the length of each of said first and second control pulse time is shorter than the length of the shortest cloud echo signal that may be expected.

* * * * *